June 2, 1931.  E. G. BULLIS  1,808,129
AUTOMOBILE DOOR
Filed Dec. 22, 1927
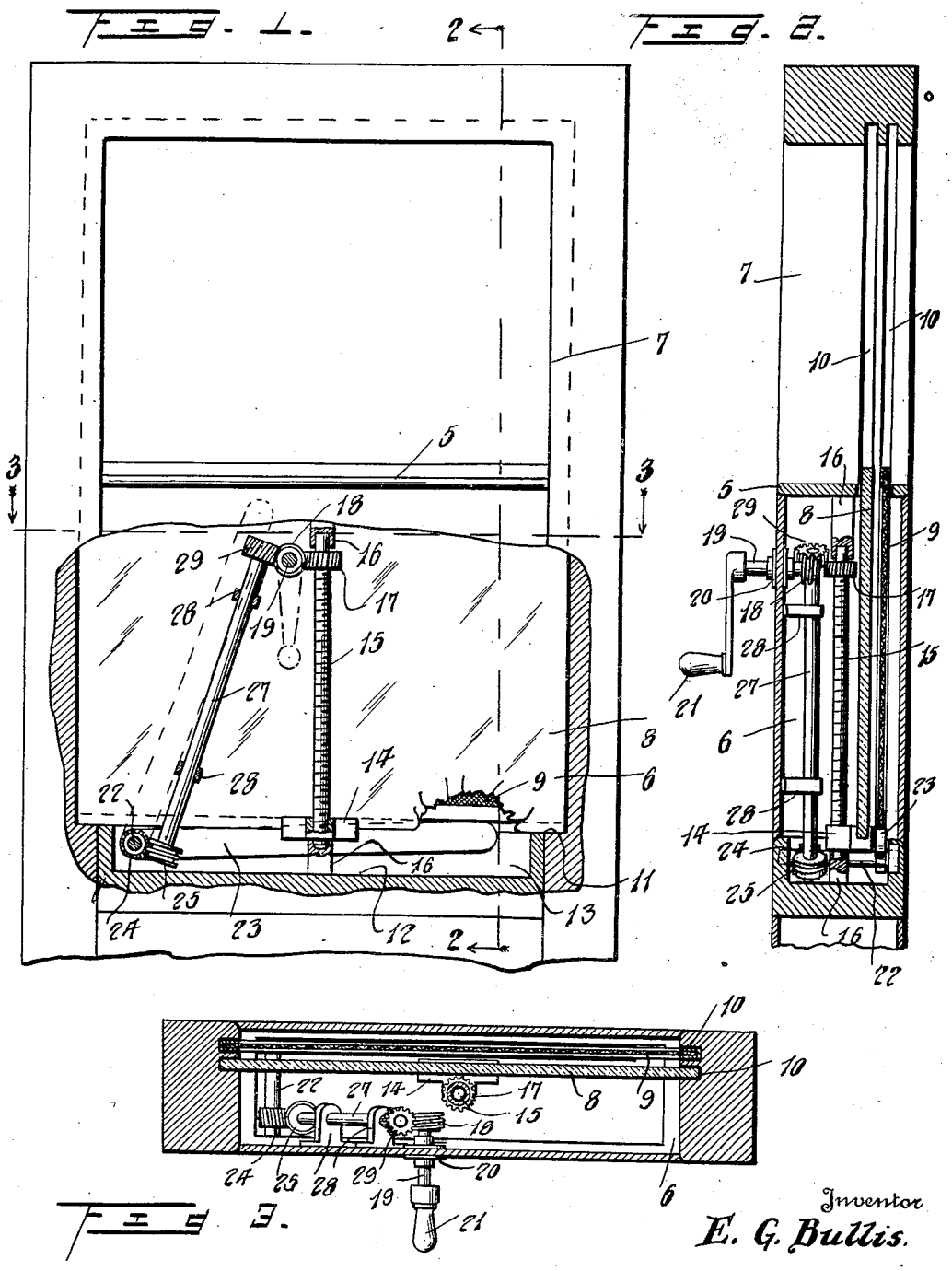
Inventor
E. G. Bullis.

Patented June 2, 1931

1,808,129

UNITED STATES PATENT OFFICE

EMORY G. BULLIS, OF FULTON, NEW YORK

AUTOMOBILE DOOR

Application filed December 22, 1927. Serial No. 241,996.

This invention relates to automobile doors and the object of the invention is to provide an automobile door equipped with a screen panel in addition to the usual window glass panel together with means whereby both of said panels may be actuated through the instrumentality of a single operating handle.

Another object of the invention is to provide an arrangement of parts enabling either the screen panel or the window glass panel to be raised or lowered irrespective of the position of the other panel.

Other objects, advantages and characteristic features of the invention as well as the details of construction and arrangement of parts characterizing the embodiment disclosed herein will be more readily understood from the following detailed description and accompanying drawings in which, Figure 1 is a view partly in side elevation and partly in vertical section of an automobile door equipped with my invention.

Figure 2 is a longitudinal vertical sectional view taken along the line 2—2 of Figure 1 and, Figure 3 is a transverse sectional view taken along the line 3—3 of Figure 1.

Referring more particularly to the drawings, 5 designates an automobile door having its lower portion in the form of a casing 6 and its upper portion provided with a window opening 7. A glass panel 8 and a screen panel 9 are mounted in suitable guide ways 10 so as to travel vertically from a lowered position within the casing 6 to an elevated position obstructing the window opening 7. In lowered position both panels rest on supporting shoulders 11 formed in the lower portion of casing 6 above the bottom wall 12 whereby a clearance or pocket 13 is reserved between said wall 12 and the lower edges of the panels. Both the panel 8 and screen panel 9 have a driven means connected therewith, and are adapted to be selectively operated by a single driving means.

The driven means for the glass panel 8 includes a block which is secured to said panel and through which is threaded a vertically disposed screw 15 having its terminals mounted in suitable bearings 16. Near the upper bearing 16 this screw is provided with a worm gear 17 adapted at times to be engaged and driven by a worm 18 fixed to a rotatable spindle 19 passing slidably through a suitable bearing 20 formed in the inner wall of the casing 6, said spindle 19 being equipped at its outer end with an operating crank 21.

The driven means for the panel 9 includes a transversely extending shaft 22 journalled at one end of the pocket 12 and provided with a relatively long crank arm 23 adapted to engage the lower edge of the screen panel 9. At the end remote from crank arm 23 the shaft 22 is provided with a worm 24 meshing with a worm wheel 25 fixed to the lower end of a vertically extending inclined shaft 27. Shaft 27 is mounted in suitable bearings 28 and is equipped at its upper end with a worm gear 29 adapted at times to be engaged and driven by the worm 18 of the crank operated spindle 19. In other words the worm 18 and the crank operated spindle 19 constitutes a single driving means, adapted to be singly and selectively used in conjunction with the panel driven means above described. As shown to advantage in Figures 2 and 3 the relative arrangement of the shafts 15 and 27 and the spindle 19 is such that the worm of spindle 19 may be selectively engaged with either of the worm gears 17 and 29 by sliding the spindle inwardly or outwardly.

When the parts are in the position shown in Figure 2 it will be apparent that by turning the crank 21 in the proper direction the crank arm 23 of shaft 22 will be raised to carry the screen panel 9 upwardly to a position obstructing the opening 7. When it is desired to raise the window panel 8 the spindle 19 is shifted inwardly to mesh the worm 18 with the gear 17.

While no means are shown for securing the screen panel 9 in raised position it will be understood that any of the well known mechanical expedients may be resorted to for this purpose.

Having described what I now conceive to be a preferred embodiment of the invention it will be understood that various changes may be resorted to within the scope and spirit of the appended claims.

What I claim is:

1. An automobile door having a window opening formed in the upper half thereof and a casing in the lower half thereof, a glass panel and a screen panel adapted to be housed in said casing or to be projected therefrom to an elevated position within said window opening, a pair of rotary shafts mounted in said casing, each of said shafts being connected to one of said panels by means functional to raise or lower the panel dependent on the direction of rotation of said shaft, an operating handle journalled in one wall of said casing and a drive gear fixed to said handle and adapted to be selectively engaged with driven gears carried by said shafts to effect independent actuation of said panels.

2. An automobile door having a window opening formed in the upper half thereof and a casing formed in the lower half thereof, the inner side surfaces of said door being provided with parallel guide channels extending from the lower portion of said casing to the upper portion of the window opening, a glass panel and a window screen panel slidably mounted in said panels and adapted to occupy a lowered position within said casing or an elevated position within said window opening, a pair of driven gears rotatably mounted in said casing, a connection between each gear and one of said panels functional to raise or lower the panel dependent upon the direction of rotation of said gear, a handle member journalled in a wall of said casing and a drive gear fixed to said handle member and shiftable into engagement with either of said driven gears.

3. An automobile door having a window opening formed in the upper half thereof and a casing in the lower half thereof, a glass panel and a screen panel adapted to be housed in said casing or to be projected therefrom to an elevated position within said window opening, a driven means connected to each of said panels, a single driving means, and means for causing the motion of the driving means to be transmitted to either of said driven means independently of the other, all these elements being concealed within the door casing.

In testimony whereof I hereunto affix my signature.

EMORY G. BULLIS.